(12) United States Patent
Kawamura et al.

(10) Patent No.: US 12,248,181 B2
(45) Date of Patent: Mar. 11, 2025

(54) OPTICAL MODULE

(71) Applicant: Nippon Telegraph and Telephone Corporation, Tokyo (JP)

(72) Inventors: Yuriko Kawamura, Musashino (JP); Takashi Yamada, Musashino (JP); Yusuke Nasu, Musashino (JP); Yuichiro Ikuma, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 178 days.

(21) Appl. No.: 18/005,141

(22) PCT Filed: Aug. 5, 2020

(86) PCT No.: PCT/JP2020/030090
§ 371 (c)(1),
(2) Date: Jan. 11, 2023

(87) PCT Pub. No.: WO2022/029941
PCT Pub. Date: Feb. 10, 2022

(65) Prior Publication Data
US 2023/0258872 A1 Aug. 17, 2023

(51) Int. Cl.
*G02B 6/30* (2006.01)
*G02B 6/36* (2006.01)
*G02B 6/44* (2006.01)

(52) U.S. Cl.
CPC ............... *G02B 6/30* (2013.01); *G02B 6/362* (2013.01); *G02B 6/444* (2013.01)

(58) Field of Classification Search
CPC ........... G02B 6/30; G02B 6/362; G02B 6/444
See application file for complete search history.

(56) References Cited

U.S. PATENT DOCUMENTS

| 6,290,401 B1 * | 9/2001 | Tian | G02B 6/4226 385/91 |
| 11,360,278 B2 * | 6/2022 | Doerr | G02B 6/428 |
| 2007/0189697 A1 | 8/2007 | Oguma | |
| 2016/0124164 A1 | 5/2016 | Doerr | |

FOREIGN PATENT DOCUMENTS

| JP | H04-191705 A | 7/1992 |
| JP | 2007-156117 A | 6/2007 |
| JP | 4210268 B2 | 1/2009 |
| JP | 5363514 B2 | 12/2013 |
| JP | 2020-112654 A | 7/2020 |

* cited by examiner

*Primary Examiner* — Daniel Petkovsek
(74) *Attorney, Agent, or Firm* — Workman Nydegger

(57) ABSTRACT

An optical module is provided with a columnar protrusion over the entire pickup area (EP) for automatic suction by a mounting device at the center of the upper surface of a fiber holding carrier. The protrusion secures a dedicated pickup area (EP1) on a top surface. When an extra length of an optical fiber extending from an optical device is routed and held between a pair of wall portions, the extra length including a tip portion is held in a storage area of the fiber holding carrier by a restoring force caused by being pressed against the wall portions.

6 Claims, 4 Drawing Sheets

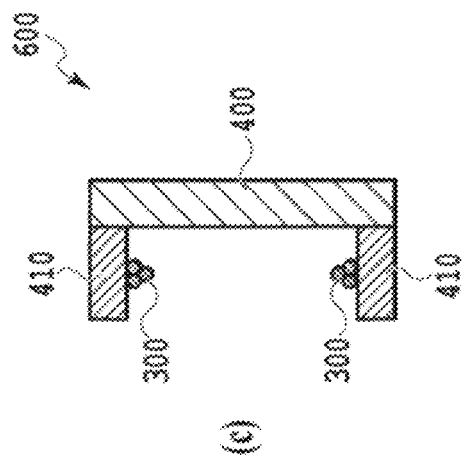
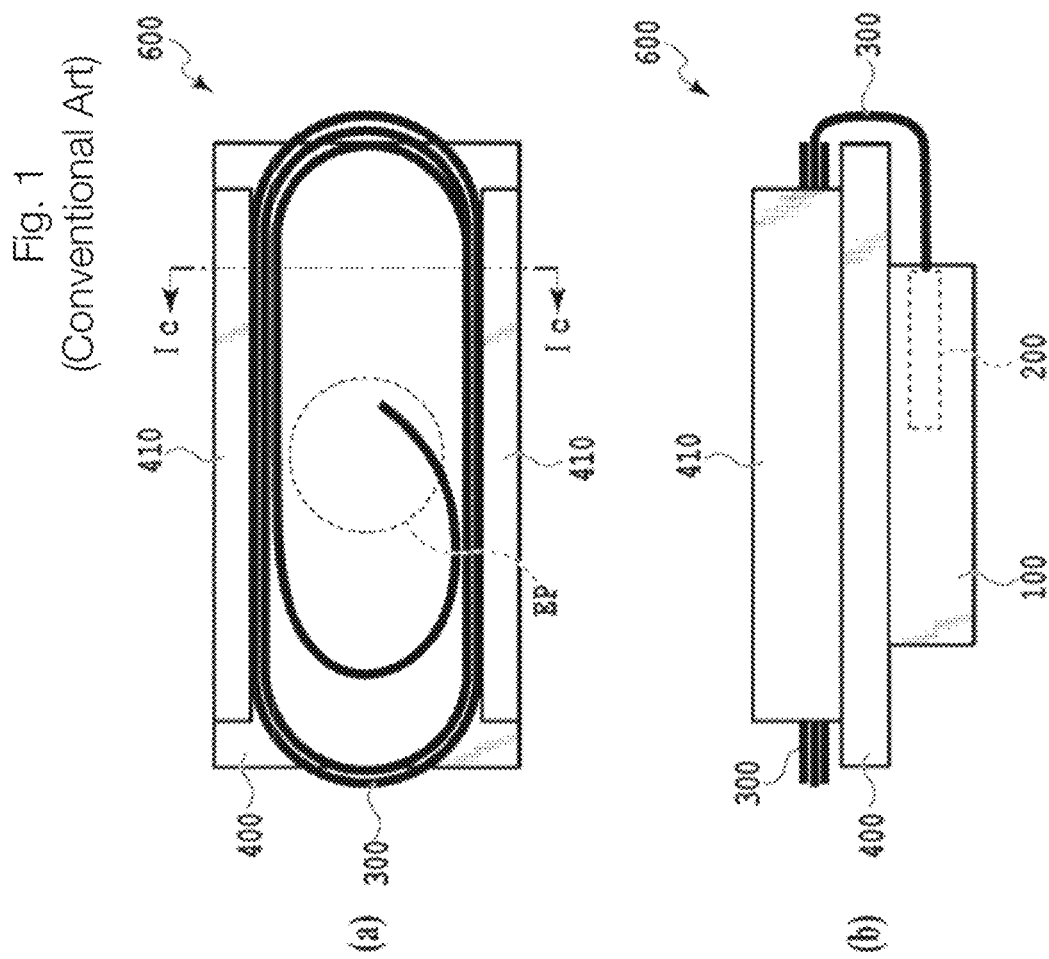
Fig. 1
(Conventional Art)

OPTICAL MODULE

TECHNICAL FIELD

The present invention relates to an optical module, which is an optical communication component that transmits and processes high-frequency electrical signals and optical signals.

BACKGROUND ART

As a technology for downsizing an optical module in which an optical fiber is held, a surface mounting technology for a substrate using a ball grid array (hereinafter referred to as BGA) has recently attracted attention.

For example, a BGA package is mounted on a substrate by reflow soldering. Thus, as compared with a case where a package with pins on sides used in a conventional optical module or a flexible printed circuit (FPC) package is mounted by soldering, a reduction in mounting cost can also be expected.

In general, input light related to an optical device and output light that is a high-speed optical signal are input and output via an optical fiber. That is, the optical fiber is optically coupled to an optical waveguide chip incorporated in the optical device, and thus an optical module with an optical fiber is formed. However, in surface mounting on a substrate using a BGA package, it is difficult to suck and carry an optical module including a long optical fiber with a mounting device.

Thus, it is conceivable to compactly hold optical fiber by some method. For example, a technology has been proposed in which an optical fiber is coiled and wound and then fitted in an optical fiber extra length storage portion provided between receptacles in between a receptacle configuration face and an optical circuit disposing face (see Patent Literature 1). In addition, a technology is known in which an optical fiber is pressed against a wall structure provided in a housing or an optical fiber gripping portion of an optical connector, and the optical fiber is held by a restoring force of the optical fiber (see Patent Literature 2). The latter technology of using the wall structure to hold the optical fiber to be coupled to an optical device has attracted attention because the technology requires less time and effort for storing the optical fiber and is convenient as compared with a case where the optical fiber is coiled and fitted in the optical fiber extra length storage portion.

FIG. 1 is a schematic diagram illustrating a basic structure of an optical module 600 using a conventional wall structure. FIG. 1(a) is a top view of the optical module 600. FIG. 1(b) is a side view of the optical module 600. FIG. 1(c) is an end view of the optical module 600 taken along line Ic-Ic in FIG. 1(a).

Referring to FIGS. 1(a) to 1(c), the optical module 600 has a structure in which an optical device 100 with an optical fiber 300 is attached to and mounted on a fiber holding carrier 400 having a tabular base. The optical device 100 incorporates, for example, an optical IC chip 200 as an optical waveguide chip, and the optical fiber 300 is optically coupled to the optical IC chip 200 so as to be connected and held. In addition, a pair of wall portions 410 is erected on the upper surface side of the fiber holding carrier 400 so as to face each other in the vicinity of long side edges thereof, and the optical device 100 is attached and fixed to the lower surface side of the fiber holding carrier 400.

In a state after the optical device 100 has been attached to the fiber holding carrier 400, an extra length of the optical fiber 300 extending from the optical device 100 is routed and held between the pair of wall portions 410. At this time, the extra length of the optical fiber 300 is fixed between the pair of wall portions 410 by the restoring force of the optical fiber 300 when the optical fiber 300 is pressed against the pair of wall portions 410. Note that a pickup area EP indicated by a circular dotted line substantially at the center of the upper surface of the fiber holding carrier 400 illustrated in FIG. 1(a) is used for automatic sucking and carrying of the optical module 600 by a mounting device, for surface mounting.

In the optical module 600, due to the wall structure of the wall portions 410, even in a case where the optical fiber 300 is long, the extra length can be compactly held on the surface (upper surface) side of the fiber holding carrier 400 opposite to the surface to which the optical device 100 is attached. Thus, the pickup area EP at a central portion on the upper surface side of the fiber holding carrier 400 can be used for automatic suction and carrying by the mounting device. Note that the pickup area EP is sucked by a pickup tool or the like of the mounting device.

However, in the case of the optical module 600, most of the extra length of the optical fiber 300 is fixed between the pair of wall portions 410, but routing of a tip portion to be a free end is not particularly considered. Thus, for example, after the optical fiber 300 has been held, it is assumed that the position where the optical fiber 300 is held may be shifted by a shock from outside such as vibration during transportation. As a result, for example, as illustrated in FIG. 1(a), the tip portion of the extra length of the optical fiber 300 may enter the pickup area EP.

In a case where the extra length of the optical fiber 300 has entered the pickup area EP as described above, a sufficient suction force cannot be obtained when an attempt is made to suck and carry the optical module 600 by the pickup tool of the mounting device. The reason for this is that the extra length of the optical fiber 300 is interposed between the pickup area EP and a suction surface of the mounting device, and hinders suction of the pickup area EP by the suction surface of the mounting device. As a result, there is a possibility that a problem such as dropping of the optical module 600 while being carried by the mounting device occurs. In addition, in a case where image recognition is used for recognition of the pickup area EP, there is a possibility that a problem such that the image recognition returns an error result and suction is not performed occurs.

CITATION LIST

Patent Literature

Patent Literature 1: Japanese Patent No. 4210268
Patent Literature 2: Japanese Patent No. 5363514

SUMMARY OF INVENTION

The present invention has been made to solve the above problems. It is an object of an embodiment according to the present invention to provide an optical module having a structure capable of preventing an extra length of a held optical fiber from entering a pickup area for component mounting.

In order to achieve the above object, one aspect of the present invention provides an optical module including: an optical device including an optical waveguide chip; an optical fiber that being optically coupled to the optical waveguide chip; and a fiber holding carrier being attached to the optical device, having a pickup area, and holding the optical fiber, in which the fiber holding carrier is provided with a protrusion to prevent the optical fiber from entering the pickup area.

According to the above configuration, even in a case where the position where the optical fiber is held is slightly shifted by a shock from outside, it is possible to effectively prevent the protrusion from entering the pickup area. Thus, it is possible to provide an optical module having a structure capable of preventing an optical fiber from entering a pickup area for automatic suction by a mounting device.

BRIEF DESCRIPTION OF DRAWINGS

FIG. 1 is a schematic diagram illustrating a basic structure of an optical module using a conventional wall structure. (a) is a top view of the optical module. (b) is a side view of the optical module. (c) is an end view of the optical module taken along line Ic-Ic in (a).

DESCRIPTION OF EMBODIMENTS

Hereinafter, optical modules according to some embodiments of the present invention will be described in detail with reference to the drawings.

First Embodiment

Figure 2:
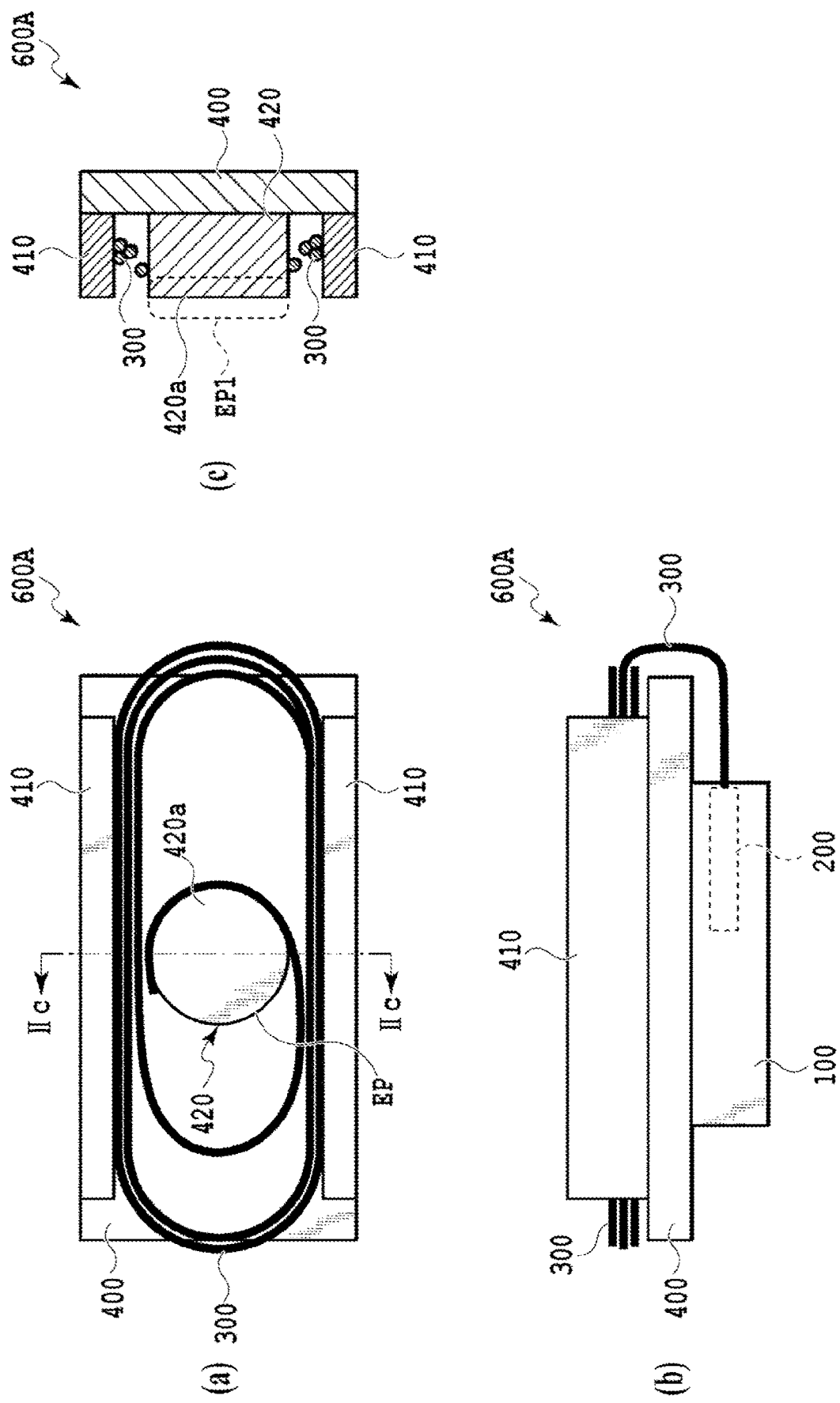
FIG. 2 is a schematic diagram illustrating a basic structure of an optical module according to a first embodiment of the present invention. (a) is a top view of the optical module. (b) is a side view of the optical module. (c) is an end view of the optical module taken along line IIc-IIc in (a).

FIG. 2 is a schematic diagram illustrating a basic structure of an optical module 600A according to a first embodiment of the present invention. FIG. 2(*a*) is a top view of the optical module 600A. FIG. 2(*b*) is a side view of the optical module 600A. FIG. 2(*c*) is an end view of the optical module 600A taken along line IIc-IIc in FIG. 2(*a*).

Referring to FIGS. 2(*a*) to 2(*c*), the optical module 600A also has a structure in which an optical device 100 with an optical fiber 300 is attached to and mounted on a fiber holding carrier 400 having a tabular base. The optical device 100 incorporates an optical IC chip 200, and the optical fiber 300 is optically coupled to the optical IC chip 200 so as to be connected and held. In addition, a pair of wall portions 410 is erected on the upper surface side of the fiber holding carrier 400 so as to face each other in the vicinity of long side edges thereof, and the optical device 100 is attached and fixed to the lower surface side of the fiber holding carrier 400. Furthermore, a columnar protrusion 420 in which a dedicated pickup area EP1 is secured is provided over the entire pickup area EP, which is for automatic suction by a mounting device and is a circular area substantially at the center of the upper surface of the fiber holding carrier 400. The protrusion 420 has the same height in a direction perpendicular to the pickup area EP as the height of the pair of wall portions 410, and has a top surface 420*a* having a flat face on top of the height, and the top surface 420*a* serves as the dedicated pickup area EP1.

That is, in the optical module 600A, as illustrated in FIG. 2(*c*), the top surface 420*a* of the protrusion 420 is used as the pickup area EP1 substituted for the existing pickup area EP. The pickup area EP1 is positioned directly above and has the same area as the pickup area EP on the upper surface of the fiber holding carrier 400. The top surface 420*a* of the protrusion 420 therefore has a structure flat to a degree sufficient for pickup. That is, the pickup area EP1 is also used for automatic suction and carrying of the optical module 600A by the mounting device for surface mounting.

For attachment of the optical device 100 to the fiber holding carrier 400, it is desirable to adopt an adhesive structure from viewpoints of ease of detachment and simplicity in configuration. Instead of the adhesive structure, a carrier, an optical device different from the optical device 100, a mechanical clamp structure provided on another member, or the like may be applied.

Also in the optical module 600A, the fiber holding carrier 400 is provided with the pair of facing wall portions 410 on a surface opposite to the surface to which the optical device 100 is attached. Thus, in a state after the optical device 100 has been attached to the fiber holding carrier 400, an extra length of the optical fiber 300 extending from the optical device 100 is routed and held between the pair of wall portions 410. At this time, the extra length including a tip portion of the optical fiber 300 is held in a storage area of the fiber holding carrier 400 by the restoring force caused by being pressed against the pair of wall portions 410. In this holding state, the tip portion of the extra length of the optical fiber 300 can be disposed along the outer periphery of the protrusion 420. As a result, the extra length including the tip portion of the optical fiber 300 is compactly held and fixed between the pair of wall portions 410 and the protrusion 420.

In the optical module 600A, due to the wall structures of the wall portions 410 and the protrusion 420, even in a case where the optical fiber 300 is long, the extra length can be compactly held on the surface (upper surface) side of the fiber holding carrier 400 opposite to the surface to which the optical device 100 is attached. Thus, the top surface 420*a* of the protrusion 420 at a central portion on the upper surface side of the fiber holding carrier 400 can be used as the pickup area EP1 for automatic suction and carrying by the mounting device. Note that the pickup area EP1 here is also sucked by a pickup tool or the like of the mounting device.

According to the optical module 600A of the first embodiment, the columnar protrusion 420 is provided over the entire existing pickup area EP on the upper surface of the fiber holding carrier 400, and the top surface 420*a* of the protrusion 420 is used as the dedicated pickup area EP1. Thus, even in a case where the position where the optical fiber 300 is held is slightly shifted by a shock from outside, it is possible to effectively prevent the tip portion of the extra length of the optical fiber 300 from entering the dedicated pickup area EP1 by an outer peripheral wall of the protrusion 420. As a result, it is possible to sufficiently prevent the tip portion of the extra length of the optical fiber 300 from entering the dedicated pickup area EP1 for automatic suction by the mounting device.

The optical module 600A shows a case where the wall structure of the protrusion 420 has a columnar shape, but even in a case where the wall structure has another pillar shape such as a polygonal columnar shape, for example, it is possible to similarly prevent the extra length of the optical fiber 300 from entering the dedicated pickup area EP1. However, in order to avoid the optical fiber 300 from being bent with a curvature radius smaller than a minimum bending radius of the optical fiber 300 when the tip portion of the extra length of the optical fiber 300 is disposed along the outer periphery of the protrusion 420, it is desirable that the protrusion 420 has a columnar shape.

Second Embodiment

Figure 3:
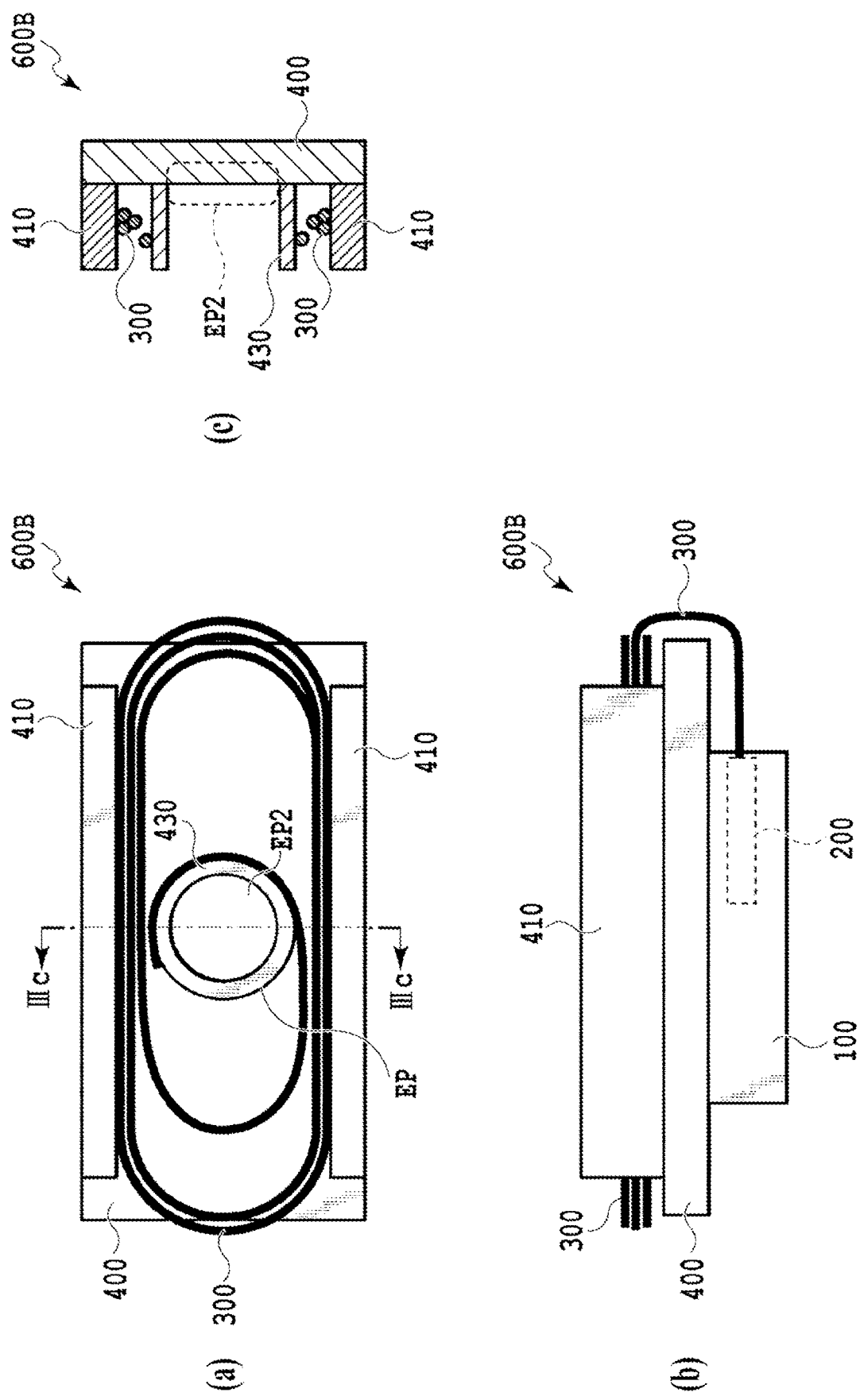
FIG. 3 is a schematic diagram illustrating a basic structure of an optical module according to a second embodiment of the present invention. (a) is a top view of the optical module. (b) is a side view of the optical module. (c) is an end view of the optical module taken along line IIIc-IIIc in (a).

FIG. 3 is a schematic diagram illustrating a basic structure of an optical module 600B according to a second embodiment of the present invention. FIG. 3(a) is a top view of the optical module 600B. FIG. 3(b) is a side view of the optical module 600B. FIG. 3(c) is an end view of the optical module 600B taken along line IIIc-IIIc in FIG. 3(a).

Referring to FIGS. 3(a) to 3(c), in the optical module 600B, instead of the columnar protrusion 420 of the optical module 600A, a hollow cylindrical protrusion 430 is provided in a peripheral portion of a pickup area EP. As illustrated in FIGS. 3(a) and 3(c), a dedicated pickup area EP2 is secured inside the cylindrical protrusion 430 on the upper surface of a fiber holding carrier 400. Since the dedicated pickup area EP2 has a narrower area than the pickup area EP due to the presence of the hollow cylindrical protrusion 430, the dedicated pickup area EP2 needs to be sufficiently flattened so as to receive a suction force necessary for vacuum suction. That is, the dedicated pickup area EP2 can be regarded as the pickup area EP corresponding to a hollow portion in the cylindrical protrusion 430 having a wall structure. The height of the hollow cylindrical protrusion 430 in a direction perpendicular to the pickup area EP is the same as the height of a pair of wall portions 410. Other components of the optical module 600B are similar to those of the optical module 600A.

The hollow cylindrical protrusion 430 is effective when the fiber holding carrier 400 is manufactured by resin molding. The reason for this is that in a case where a wall structure constituted by the columnar protrusion 420 is formed by resin molding as in the case of the first embodiment, there is a possibility that a depression is formed on the top surface 420a of the columnar protrusion 420 due to a difference in thickness between the wall structure of the protrusion 420 and the wall structure of the wall portions 410. Then, in a case where a depression is formed on the top surface 420a of the protrusion 420, flatness is hindered, and a problem such as a suction failure or falling off during carrying may occur. On the other hand, the dedicated pickup area EP2 is defined and formed by the presence of the hollow cylindrical protrusion 430, and is hardly affected by formation of the protrusion 430 because of basically having an area obtained by reducing the existing pickup area EP.

Also in the case of the optical module 600B, due to the wall structures of the wall portions 410 and the protrusion 430, even in a case of a long optical fiber 300, an extra length can be compactly held on the surface (upper surface) side of the fiber holding carrier 400 opposite to the surface to which an optical device 100 is attached. At this time, as for a tip portion of the extra length of the optical fiber 300, the tip portion of the extra length of the optical fiber 300 is disposed along the outer periphery of the protrusion 430. Thus, the hollow portion inside the protrusion 430 at a central portion on the upper surface side of the fiber holding carrier 400 can be used as the pickup area EP2 for automatic suction and carrying by a mounting device. Note that the pickup area EP2 here is also sucked by a pickup tool or the like of the mounting device.

According to the optical module 600B of the second embodiment, the hollow cylindrical protrusion 430 is provided in the peripheral portion of the existing pickup area EP on the upper surface of the fiber holding carrier 400, and the inside of the protrusion 430 is used as the dedicated pickup area EP2. Thus, even in a case where the position where the optical fiber 300 is held is slightly shifted by a shock from outside, it is possible to effectively prevent the tip portion of the extra length of the optical fiber 300 from entering the dedicated pickup area EP2 by an outer peripheral wall of the protrusion 430. As a result, it is possible to sufficiently prevent the tip portion of the extra length of the optical fiber 300 from entering the dedicated pickup area EP2 for automatic suction by the mounting device.

Third Embodiment

Figure 4:
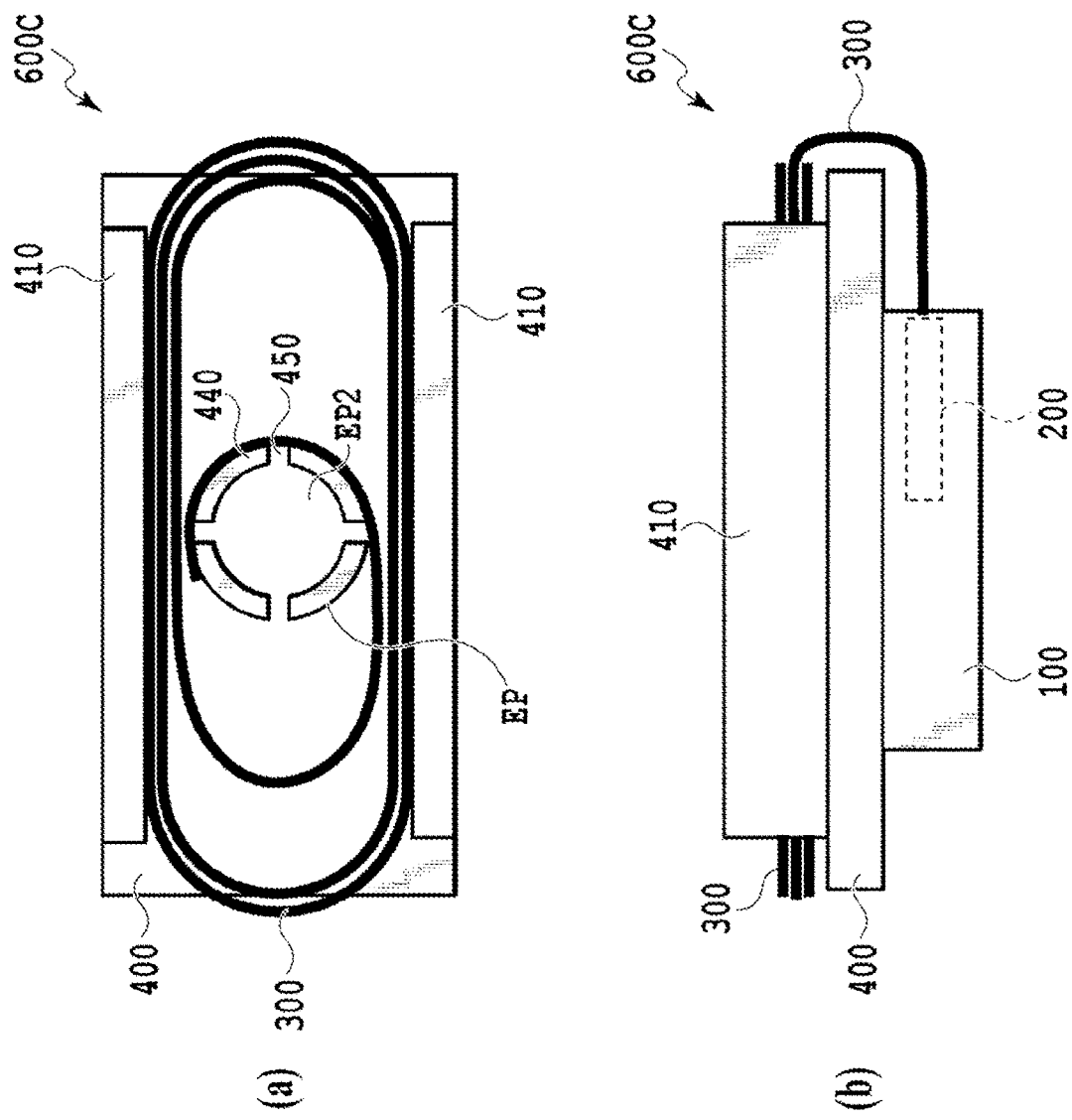
FIG. 4 is a schematic diagram illustrating a basic structure of an optical module according to a third embodiment of the present invention. (a) is a top view of the optical module. (b) is a side view of the optical module.

FIG. 4 is a schematic diagram illustrating a basic structure of an optical module 100C according to a third embodiment of the present invention. FIG. 4(a) is a top view of the optical module 100C. FIG. 4(b) is a side view of the optical module 100C.

Referring to FIGS. 4(a) to 4(c), in an optical module 600C, instead of the protrusion 430 of the optical module 600B, four protrusions 440 having a locally cylindrical shape separated by four cuts 450 are provided in a peripheral portion of a pickup area EP. As illustrated in FIG. 4(a), a dedicated pickup area EP2 is secured inside the protrusions 440 having a locally cylindrical shape on the upper surface of a fiber holding carrier 400. Since the dedicated pickup area EP2 also has a narrower area than the pickup area EP due to the presence of the protrusions 440 having a locally cylindrical shape, the dedicated pickup area EP2 needs to be sufficiently flattened so as to receive a suction force necessary for vacuum suction. The height of the protrusions 440 having a locally cylindrical shape in a direction perpendicular to the pickup area EP is the same as the height of a pair of wall portions 410. Other components of the optical module 600C are similar to those of the optical module 600A.

The protrusions 440 having a locally cylindrical shape are effective in a case where an optical device 100 is adhesively fixed to the fiber holding carrier 400. The reason for this is that after surface mounting of the optical module 600C, when the fiber holding carrier 400 is removed, it is possible to engage a protrusion of another jig with the cuts 450 and rotate the jig to remove the fiber holding carrier 400. This allows for removal without manual work of a worker, and improves convenience. Note that the optical module 100C having a configuration in which the four cuts 450 are provided in a cross shape and the four protrusions 440 having a locally cylindrical shape are provided has been described, but another number may be applied as long as the number allows for removal by rotation.

Also in the case of the optical module 600C, due to the wall structures of the wall portions 410 and the protrusions 440, even in a case of a long optical fiber 300, an extra length can be compactly held on the surface (upper surface) side of the fiber holding carrier 400 opposite to the surface to which the optical device 100 is attached. At this time, as for a tip portion of the extra length of the optical fiber 300, the tip portion of the extra length of the optical fiber 300 is disposed along the outer periphery of the protrusions 440. Thus, a hollow portion inside the protrusions 440 at a central portion on the upper surface side of the fiber holding carrier 400 can be used as the pickup area EP2 for automatic suction and carrying by a mounting device. Note that the pickup area EP2 here is also sucked by a pickup tool or the like of the mounting device.

According to the optical module 600C of the third embodiment, the protrusions 440 having a locally cylindrical shape are provided in the peripheral portion of the existing pickup area EP on the upper surface of the fiber holding carrier 400, and the inside of the protrusions 440 is used as the dedicated pickup area EP2. Thus, even in a case where the position where the optical fiber 300 is held is slightly shifted by a shock from outside, it is possible to effectively prevent the tip portion of the extra length of the optical fiber 300 from entering the dedicated pickup area EP2 by outer peripheral walls of the protrusions 440. As a result, it is possible to sufficiently prevent the tip portion of the extra length of the optical fiber 300 from entering the dedicated pickup area EP2 for component mounting.

Note that each embodiment shows a wall structure in which the extra length of the optical fiber 300 is pressed against the pair of wall portions 410 and compactly held, but instead of this, for example, a configuration may be adopted in which the extra length of the optical fiber 300 is held between groove structures. Moreover, in each embodiment, a claw structure may be provided to prevent the extra length including the tip portion of the optical fiber 300 from protruding outward beyond the top of the heights of the protrusions 420 and 430, the protrusions 440, and the pair of wall portions 410. In this case, the claw structure is provided in a direction perpendicular to the height direction of the wall portions 410. Furthermore, each embodiment exemplifies a configuration in which one long optical fiber 300 is connected to the optical IC chip 200. Alternatively, a configuration may be adopted in which a plurality of the optical fibers 300 is connected to the optical IC chip 200, and the extra length of each optical fiber 300 is held in an area for storing the extra length of each optical fiber 300 on the upper surface of the fiber holding carrier 400. Note that examples of usage of the plurality of the optical fibers 300 in this case includes usages for input light, for transmission light, for reception light, and for input light of another wavelength for wavelength multiplexing.

In addition, in the first embodiment, a configuration in which the protrusion 420 is provided over the entire pickup area EP disposed at the central portion of the upper surface of the fiber holding carrier 400 has been described. In the second embodiment and the third embodiment, configurations in which the protrusion 430 and the protrusions 440 are provided on the peripheries of the similar pickup areas EP have been described. However, alternative structures can also be applied. For example, the pickup area EP may not be at the central portion depending on the design of the position where the optical device 100 is disposed on the fiber holding carrier 400 or the position of the center of gravity due to the structure of the fiber holding carrier 400. A plurality of the pickup areas EP may be disposed depending on the shape of the pickup tool or process design. In such a case, it is possible to apply a configuration in which the protrusion 420 is provided over the pickup area EP that is not at the central portion or the entire pickup areas EP, or the protrusion 430 and the protrusions 440 are provided on the periphery of the pickup area EP or each pickup area EP.

Furthermore, in the embodiments, cases have been described in which the heights of the protrusions 420 and 430 and the protrusions 440 in the direction perpendicular to the pickup area EP are the same as the height of the wall portions 410, but the heights may be greater than the height of the wall portions 410. In addition, the height of the area in which the extra length of the optical fiber 300 is held on the upper surface of the fiber holding carrier 400 may be designed to be lower than the height of the wall portions 410 due to a claw structure or the like provided on the wall portions 410. In such a case, it is sufficient if the heights of the protrusions 420 and 430 and the protrusions 440 in the direction perpendicular to the pickup area EP are designed to be greater than the height of the area in which the extra length of the optical fiber 300 is held.

The invention claimed is:

1. An optical module comprising:
   an optical device including an optical waveguide chip;
   an optical fiber being optically coupled to the optical waveguide chip; and
   a fiber holding carrier being attached to the optical device, having a pickup area, and holding the optical fiber,
   wherein the fiber holding carrier is provided with one or more protrusions to prevent the optical fiber from entering the pickup area; and
   wherein the one or more protrusions further comprise a wall structure having a cylindrical shape with a hollow portion extending in a protruding direction, and comprise the pickup area at a bottom portion of the cylindrical shape.

2. The optical module according to claim 1, wherein the one or more protrusions has the pickup area at a top in a protruding direction.

3. The optical module according to claim 1, wherein the wall structure is provided with one or more cuts.

4. The optical module according to claim 1, wherein the pickup area has a circular shape.

5. The optical module according to claim 1, wherein
   the fiber holding carrier is provided with a plurality of wall portions on a surface opposite to a surface to which the optical device is attached, and
   the optical fiber is held in a storage area of the fiber holding carrier between the plurality of wall portions and the one or more protrusions by a restoring force caused by an extra length of the optical fiber being pressed against the plurality of wall portions, and a tip portion of the extra length is disposed along an outer periphery of the one or more protrusions.

6. The optical module according to claim 5, wherein
   the one or more protrusions further comprise, in a direction perpendicular to the pickup area, a height greater than a height of the area in which the extra length of the optical fiber is held.

* * * * *